March 9, 1937.  M. HOUDAILLE ET AL  2,073,419
RESILIENT JOINT
Filed Jan. 10, 1935
Fig.1.
Fig.2.
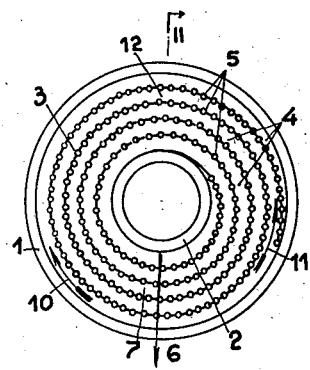
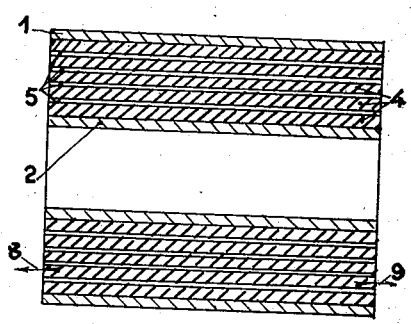
Fig.3.
Fig.4.
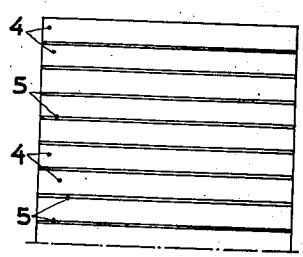
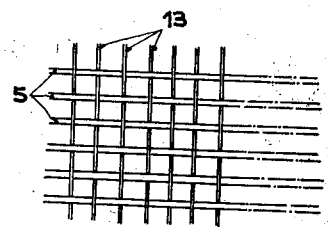
Fig.5.
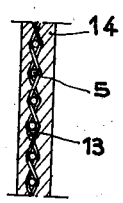
M. Houdaille & C. Lecler
INVENTORS
By Glascock Downing & Seebold
Attys.

Patented Mar. 9, 1937

2,073,419

UNITED STATES PATENT OFFICE 2,073,419

RESILIENT JOINT

Maurice Houdaille and Charles Lecler, Levallois-Perret, France

Application January 10, 1935, Serial No. 1,247

4 Claims. (Cl. 287—85)

Resilient joints are already known which are composed of an outer cylindrical socket, of a coaxial inner socket, also of cylindrical shape, and of an annular resilient body, for instance made of rubber, which adheres to the sockets between which it is placed. In such joints, the relative angular displacements of both sockets take place, below a definite limit, without any friction and by producing only a molecular distortion of the rubber.

Various means have been proposed for ensuring between the rubber and the sockets and adherence sufficient for allowing relatively large angular displacements of one of the sockets relatively to the other.

One of these means consists in securing the rubber on the sockets by gluing; this means is not of sufficient efficiency, particularly when the joints is intended to support great radial loads. In this case, in fact, the sockets radially move relatively to each other, so as to compress the rubber on one side and to expand it on the other side. This causes the rubber to become unstuck on the side where it is expanded, and produces the destruction of the joint.

A second means consists in inserting the rubber, under a very great initial pressure, between the two sockets. The mass of rubber is first considerably stretched out, for inserting it between both sockets. Then, this mass of rubber is left to freely expand between the sockets. This solution avoids the inconvenience above mentioned, but the joints thus produced are deprived of any resiliency in the radial direction.

A third means consists in constituting the mass of rubber by winding a rubber strip in the form of a plurality of superposed turns. This arrangement is excellent, but it does not allow great radial loads to be supported. The portions of the rubber turns which are subjected to compression stretch out parallel to the axis, and the ends of these turns laterally extend beyond each other, this having for effect to destroy the joint.

The technical problem which is at the basis of the present invention consists in preventing this axial stretching out of the rubber turns in resilient joints of the type last described.

Generally speaking, the invention consists for that purpose, in interposing between these turns threads, for example and preferably textile threads, and in any case, capable of resisting to elongation; these threads are arranged parallel to the geometrical axis of the joint, that is to say transversely to the unwound rubber strip, or under a small obliquity; they are coated with a material allowing them to firmly adhere to the rubber turns, but they remain independent from each other in order that the relative oscillations of the sockets and the molecular distortions of the rubber during these oscillations should not be hindered in any way.

It has already been proposed to constitute bearings (and not resilient joints) by means of two sockets between which is interposed a coil formed of a rubber strip the turns of which are separated by a strip of canvas or other fabric firmly stretched for compressing the rubber turns and firmly adhering to the latter.

Such bearings cannot be used as resilient joints, because the threads which are stretched lengthwise of the rubber strip prevent the free molecular distortion of said rubber, when the sockets rotate relatively to each other. The invention essentially differentiates from this bearing by the scope of its application, which is different, and by the construction, since the threads resisting to elongation are all parallel to each other and also parallel to the geometrical axis of the joint, or at least slightly inclined relatively to this axis.

The accompanying drawing illustrates, by way of example only, a form of carrying the invention into practice.

Fig. 1 is an elevation of the end of the joint.

Fig. 2 is a sectional view thereof made according to line II—II of Fig. 1.

Fig. 3 is a view of a rubber strip provided with transverse threads capable of resisting to elongation.

Fig. 4 is a view showing the constitution of a special fabric for the manufacture of the joint.

Fig. 5 is a section of this special fabric.

The joint is constituted by two cylindrical sockets: an outer socket 1 and an inner socket 2, which are arranged within each other so as to have, at least approximately, the same geometrical axis, and between which is arranged a rubber body 3 constituted as will be indicated hereinafter.

Use is made of a rubber strip 4 which is wound on the inner socket 2, but care is taken, before effecting this winding operation, to place on this strip threads capable of resisting to elongation as shown for instance at 5 in Figs. 1 and 3. These threads are preferably arranged parallel to the geometrical axis of the sockets 1 and 2, that is to say transversely to the strip 4, as more clearly shown in Fig. 3, but they might also be given a slight obliquity. The threads 5 are for instance glued on the strip 4 so as to firmly adhere thereto.

When the winding of the strip 4 reaches the thickness corresponding to the inner diameter of the socket 1, the whole is pushed in with a slight pressure, if need be after having coated the outer part of the body 3 with a layer of rubber solution, within said socket 1. The joint thus constituted operates as follows:

Concerning the relative oscillations of the sockets 1 and 2 about their geometrical axis, the threads 5 do not fulfill any function, these threads being independent from each other. They do not prevent in any way the molecular distortions and are not prejudicious to the phenomena of winding and unwinding the strip 4 which ensure, as in the already known joints of this type, the firm adherence of the rubber to the sockets 1 and 2.

On the contrary, concerning the radial loads, for instance a load which would be directed according to the arrow 6, the threads which firmly adhere to the rubber prevent elongation of the latter in the zone 7, which elongation, if these threads did not exist, would take place in the direction of the arrows 8 and 9 (Fig. 2). The rubber compressed in the zone 7 tends to flow towards the noncompressed zones, and, as it can no longer flow in the direction of the arrows 8 and 9, it flows in the direction of the arrows 10 and 11 towards the zone 12 which is not compressed.

By this means, two extremely important advantages are obtained:

1. Owing to the fact that the rubber no longer flows in the direction of the arrows 8 and 9, the resistance to crushing stress of the joint is considerably increased. In fact, the turns can no longer stretch out and laterally extent beyond each other, which previously caused the destruction of the joint.

2. The turns no longer become detached from each other and from the sockets 1 and 2 in the zone 12, since the compressed rubber flows towards this zone 12, as above explained.

In order to avoid sticking the threads 5 on the strip 4, a fabric which is similar to an ordinary canvas, can be constituted with said threads 5 and with other threads such as 13 (Fig. 4). However, the diameter and quality of the threads 13 are so chosen that the latter are unable to resist to an elongation stress and that, consequently, said threads break as soon as they are subjected to a tension stress, even relatively small, contrarily to the threads 5 which must be capable of resisting to important tension stresses. The fabric thus constituted is preferably encased in a layer of gum 14 (Fig. 5), in such a manner that these threads firmly adhere to the gum 14 and that the latter firmly adheres to the strip 4 when it is put in contact with the same.

The manufacture of the joint is then started by simultaneously winding the rubber strip 4 and a strip made of a fabric as just described, the threads 5 being of course substantially parallel to the axis of the joint.

The joint thus constituted operates exactly in the same way as previously. In fact, it will be clearly understood that, since the threads 13 are unable to support a tension stress, as soon as relative oscillations of the socket 1 and of the socket 2 will take place, which oscillations would tend to lengthen the threads 13, the latter break and consequently can no longer have any action.

What we claim as our invention and desire to secure by Letters Patent is:

1. In a resilient joint, inner and outer cylindrical sockets, a rubber body arranged between said sockets, said body being constituted by a plurality of turns of a wound rubber strip, and threads arranged between the turns of the strip and disposed substantially parallel to the axis of the sockets, said threads being freely movable radially and circumferentially of the socket axis under distortion of the rubber body but being inextensible longitudinally of said sockets.

2. In a resilient joint, inner and outer cylindrical sockets, a rubber body arranged between said sockets, said body being constituted by a plurality of turns of a wound rubber strip, threads arranged between the turns of the strip and disposed substantially parallel to the axis of the sockets, said threads being freely movable radially and circumferentially of the socket axis under distortion of the rubber body but being inextensible longitudinally of said sockets, and means for causing said threads to adhere to said strip.

3. In a resilient joint, inner and outer cylindrical sockets, a rubber body arranged between said sockets, a strip of fabric, said rubber body being constituted by a plurality of turns of a wound rubber strip with the fabric arranged in facial contact with said strip and interposed between the turns thereof, said fabric being constituted by one set of substantially non-elastic threads disposed substantially parallel to the theoretical winding axis of the strip and by a second set of threads of relatively low resistance adapted to be ruptured when subjected to tension.

4. A joint as claimed in claim 3, characterized by the provision of a coating attaching said fabric to said strip.

MAURICE HOUDAILLE.
CHARLES LECLER.